US007002558B2

(12) United States Patent
Keely et al.

(10) Patent No.: US 7,002,558 B2
(45) Date of Patent: Feb. 21, 2006

(54) MODE HINTING AND SWITCHING (75) Inventors: Leroy B. Keely, Portola Valley, CA (US); F. David Jones, Redmond, WA (US); Robert Jarrett, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 139 days.

(21) Appl. No.: 09/741,107

(22) Filed: Dec. 21, 2000

(65) Prior Publication Data
US 2002/0080126 A1 Jun. 27, 2002

(51) Int. Cl.
*G09G 5/00* (2006.01)
(52) U.S. Cl. .................................... 345/179; 382/189
(58) Field of Classification Search ............... 345/180, 345/173–179, 157, 182; 178/18.01, 19.01; 382/189, 187
See application file for complete search history.

(56) References Cited

U.S. PATENT DOCUMENTS

| | | | |
|---|---|---|---|
| 4,633,436 A * | 12/1986 | Flurry | ........................ 345/179 |
| 5,239,466 A | 8/1993 | Morgan et al. | |
| 5,347,295 A | 9/1994 | Agulnick et al. | |
| 5,517,578 A | 5/1996 | Altman et al. | |
| 5,572,643 A | 11/1996 | Judson | |
| 5,625,833 A | 4/1997 | Levine et al. | |
| 5,632,022 A | 5/1997 | Warren et al. | |
| 5,680,636 A | 10/1997 | Levine et al. | |
| 5,687,331 A | 11/1997 | Volk et al. | |
| 5,717,879 A | 2/1998 | Moran et al. | |
| 5,727,129 A | 3/1998 | Barrett et al. | |
| 5,729,687 A | 3/1998 | Rothrock et al. | |
| 5,745,116 A | 4/1998 | Pisutha-Arnond | |
| 5,760,773 A | 6/1998 | Berman et al. | |
| 5,790,818 A | 8/1998 | Martin | |
| 5,801,687 A | 9/1998 | Peterson et al. | |
| 5,821,925 A | 10/1998 | Carey et al. | |
| 5,832,263 A | 11/1998 | Hansen et al. | |
| 5,838,914 A | 11/1998 | Carleton et al. | |
| 5,845,262 A | 12/1998 | Nozue et al. | |
| 5,877,757 A | 3/1999 | Baldwin et al. | |
| 5,893,132 A | 4/1999 | Huffman et al. | |
| 5,918,236 A | 6/1999 | Wical | |
| 5,920,694 A | 7/1999 | Carleton et al. | |
| 5,931,912 A | 8/1999 | Wu et al. | |
| 5,933,140 A | 8/1999 | Strahorn et al. | |
| 5,937,416 A | 8/1999 | Menzel | |
| 5,948,040 A | 9/1999 | DeLorme et al. | |
| 5,950,214 A | 9/1999 | Rivette et al. | |

(Continued)

FOREIGN PATENT DOCUMENTS

WO    WO 87/01481    3/1987

(Continued)

OTHER PUBLICATIONS

Patent Abstracts of Japan, Publication No. 11327789 for Color Display and Electronic Blackboard System, publication date Nov. 30, 1999.

(Continued)

*Primary Examiner*—Amr A. Awad
(74) *Attorney, Agent, or Firm*—Banner & Witcoff, Ltd.

(57) ABSTRACT

The present invention relates to switching modes of an input device based on events. The invention detects events that suggest that the user does not want to continue with a present mode of the input device and switches to another operation mode. The detection and response to user inputs simplifies the user's interactions with the system. In some embodiments, the user may be asked prior to switching modes for confirmation. The present invention may be used with limited input devices including styluses.

22 Claims, 5 Drawing Sheets

U.S. PATENT DOCUMENTS

| | | | |
|---|---|---|---|
| 5,978,818 A | 11/1999 | Lin | |
| 5,986,665 A | 11/1999 | Wrey et al. | |
| 6,011,537 A | 1/2000 | Slotznick | |
| 6,012,055 A | 1/2000 | Campbell et al. | |
| 6,018,334 A | 1/2000 | Eckerberg et al. | |
| 6,018,342 A | 1/2000 | Bristor | |
| 6,018,742 A | 1/2000 | Herbert, III | |
| 6,035,330 A | 3/2000 | Astiz et al. | |
| 6,049,812 A | 4/2000 | Bertram et al. | |
| 6,052,514 A | 4/2000 | Gill et al. | |
| 6,054,990 A | 4/2000 | Tran | |
| 6,081,829 A | 6/2000 | Sidana | |
| 6,088,481 A * | 7/2000 | Okamoto et al. | 382/189 |
| 6,091,930 A | 7/2000 | Mortimer et al. | |
| 6,094,197 A | 7/2000 | Buxton et al. | |
| 6,118,437 A * | 9/2000 | Fleck et al. | 345/179 |
| 6,122,649 A | 9/2000 | Kanerva et al. | |
| 6,128,007 A * | 10/2000 | Seybold | 345/179 |
| 6,157,381 A | 12/2000 | Bates et al. | |
| 6,181,344 B1 | 1/2001 | Tarpenning et al. | |
| 6,195,679 B1 | 2/2001 | Bauersfeld et al. | |
| 6,195,694 B1 | 2/2001 | Chen et al. | |
| 6,199,082 B1 | 3/2001 | Ferrel et al. | |
| 6,205,455 B1 | 3/2001 | Umen et al. | |
| 6,230,171 B1 | 5/2001 | Pacifici et al. | |
| 6,239,792 B1 * | 5/2001 | Yanagisawa et al. | 345/179 |
| 6,262,719 B1 * | 7/2001 | Bi et al. | 345/179 |
| 6,271,840 B1 | 8/2001 | Finseth et al. | |
| 6,279,005 B1 | 8/2001 | Zellweger | |
| 6,279,014 B1 | 8/2001 | Schilit et al. | |
| 6,289,362 B1 | 9/2001 | Van Der Meer | |
| 6,301,590 B1 | 10/2001 | Siow et al. | |
| 6,321,244 B1 | 11/2001 | Liu et al. | |
| 6,335,727 B1 * | 1/2002 | Morishita et al. | 345/179 |
| 6,340,967 B1 * | 1/2002 | Maxted | 345/179 |
| 6,369,811 B1 | 4/2002 | Graham et al. | |
| 6,389,434 B1 | 5/2002 | Rivette et al. | |
| 6,393,422 B1 | 5/2002 | Wone | |
| 6,405,221 B1 | 6/2002 | Levine et al. | |
| 6,421,065 B1 | 7/2002 | Walden et al. | |
| 6,446,110 B1 | 9/2002 | Lection et al. | |
| 6,460,058 B1 | 10/2002 | Koppolu et al. | |
| 6,486,895 B1 | 11/2002 | Robertson et al. | |
| 6,490,603 B1 | 12/2002 | Keenan et al. | |
| 6,493,006 B1 | 12/2002 | Gourdol et al. | |
| 6,535,294 B1 | 3/2003 | Arledge, Jr. et al. | |
| 6,539,370 B1 | 3/2003 | Chang et al. | |
| 6,560,621 B1 | 5/2003 | Barile | |
| 6,571,295 B1 | 5/2003 | Sidana | |

FOREIGN PATENT DOCUMENTS

| | | |
|---|---|---|
| WO | WO 96/20908 | 7/1996 |
| WO | WO 97/22109 | 6/1997 |
| WO | WO 98/06054 | 2/1998 |
| WO | WO 98/09446 | 3/1998 |
| WO | WO 99/49383 | 9/1999 |

OTHER PUBLICATIONS

"Adobe Acrobat 3.0 Reader Online Guide", Adobe Systems, Inc., pp. 1-110, (undated).

Kunikazu, T., Patent Abstracts of Japan, Publication No. 11327789 for Color Display and Electronic Blackboard System, published Nov. 30, 1999.

Open eBook Forum, Open eBook™ Publication Structure 1.0, Sep. 16, 1999, http://www.ebxwg.org/oebps/oebps1.0/download/oeb1-oebps.htm.

Kristensen, A., "Formsheets and the XML Forms Language" (Mar. 1999).

Dublin Core Resource Types: Structurality DRAFT: Jul. 24, 1997, Nov. 20, 1999.

Dublin Core Metadata Element Set, Version 1.1: Reference Description Nov. 20, 1999.

Dublin Core Metadata Initiative: User Guide Working Draft Jul. 31, 1998, 1999.

SOFTBOOK® Press, The Leader in Internet-Enabled Document Distribution and Reading Systems; http://www.softbook.com/consumer/reader.asp, 1998-1999.

Rocket eBook Using the Rocket eBook; http://www.rocketbook.com/Products/Fag/using.html, Oct. 14, 1999.

Explore the Features of the Rocket eBook; wysiwyg://212http://www.rocketbook.com/Products/Tour/index.html, undated.

Computer Networks and ISDN Systems "Responsive interaction for a large Web application: the meteror shower architecture in the WebWriter II Editor", 1997, pp. 1508-1517.

Hirotsu et al., "Cmew/U—A Multimedia Web Annotation Sharing System", NTT Network Innovation Laboratories—Japan, IEEE, 1999, pp. 356-359.

Kuo et al., "A Synchronization Scheme for Multimedia Annotation", Multimedia Information Networking Laboratory, Tamkang University—Taiwan, IEEE, 1997, pp. 594-598.

aha! InkWriter™ The simplicity of pen and paper, the power of word processing., Advertisement 1993, 1994, 2 pp., aha! software corporation, Mountain View, CA.

aha! InkWriter® for Magic Cap "The fastest, most convenient way to create faxes, notes and messages." Advertisement, 1994, 1995, 2 pp., aha! software corporation, Mountain View, CA.

aha! 2.0 for Windows InkWriter™ The power of word processing, the convenience of pen and paper Advertisement, 1993, 1994, 2 pp., aha! software corporation, Mountain View, CA.

aha! software products, Sep. 24, 1997, pp. 1-5, aha! software corporation, Mountain View, CA http://www.ahasoft.com//product.htm.

* cited by examiner

MODE HINTING AND SWITCHING

CROSS-REFERENCE TO RELATED APPLICATIONS

The present application is related to application Ser. No. 09/760,631, entitled "Method and Apparatus For Improving the Appearance of Digitally Represented Handwriting", filed Nov. 10, 2000; to application Ser. No. 09/736,170, entitled "Highlevel Active Pen Matrix" filed Nov. 10, 2000; to application Ser. No. 09/768,171, entitled "Selection Handles in Editing Electronic Documents", and filed Nov. 10, 2000; to application Ser. No. 09/813,354, entitled "Insertion Point Bungee Space Tool", and filed Nov. 10, 2000; to application Ser. No. 09/815,272, entitled "Simulating Gestures of a Mouse Using a Stylus and Providing Feedback Thereto", and filed Nov. 10, 2000; to application Ser. No. 10/928,306, entitled "System and Method For Accepting Disparate Types Of User Input", and filed Nov. 10, 2000; to application Ser. No. 60/247,972, entitled "In Air Gestures", and filed Nov. 10, 2000; to application Ser. No. 60/247,831, entitled "Mouse Input Panel Windows Class List", and filed Nov. 10, 2000; to application Ser. No. 60/247,843, entitled "Mouse Input Panel and User Interface", and filed Nov. 10, 2000; to application Ser. No. 60/247,831, entitled "System and Method For Inserting Implicit Page Breaks", and filed Nov. 10, 2000; each of which is incorporated by reference herein.

FIELD OF THE INVENTION

Aspects of the present invention are directed generally to apparatus and methods for controlling a graphical user interface (GUI). More particularly, the present invention relates to receiving entering a user input, determining based on the user input what the user wants to do, and performing a function related to the desired input.

BACKGROUND OF THE INVENTION

Typical computer systems, especially computer systems using graphical user interface (GUI) systems such as Microsoft WINDOWS, are optimized for accepting user input from one or more discrete input devices such as a keyboard and for entering text, and a pointing device such as a mouse with one or more buttons for driving the user interface. Virtually all software applications designed to run on Microsoft WINDOWS are optimized to accept user input in the same manner. For instance, many applications make extensive use of the right mouse button (a "right click") to display context-sensitive command menus. The user may generate other gestures using the mouse such as by clicking the left button of the mouse (a "left click"), or by clicking the left or right button of the mouse and moving the mouse while the button is depressed (either a "left click drag" or a "right click drag").

In some environments, a mouse is not usable or desirable. For example, in a digitizer tablet environment, the primary input device may be a stylus. While a stylus attempts to provide pad and paper-like feel to a computing environment, current systems are limited. For example, the use of a stylus in a graphical user interface is limited to tapping on various items for selection. See, for example, the Palm-series of products using the Palm OS 3.x operating systems. Further, in stylus-based input environments, a user is continually forced to select tools or operations from a remote tool bar, generally on a top or bottom of a screen. While a user can type in letters or have the digitizer recognize handwriting, these operations require selecting a keyboard input mode and writing in a predefined portion of the digitizer, respectively. In short, requiring a user to tell the computer, for every new input, what a user wants to do makes stylus-based computing difficult for the average user.

Some operations create new text (for example, writing, typing, pasting text and the like). Other operations modify the text (highlighting, inking, erasing, cutting and moving existing text). A problem with performing the latter modifying operations is that these latter operations are not generally the primary mode of operating for most users. In other words, while a user may modify text, this operation will be secondary to more primary operations of creating new text. Accordingly, the user will eventually need to transition from the modifying text (or other content) operation to the creating text environment. Conventional transitions include toggling a button on a tool bar. Buttons may include an erase button, a highlight button and the like. Toggle buttons, while making it clear for a user on how to select the operating mode and the state of the mode (by being depressed or not), can be cumbersome to use when alternating between various modes in that the user is continuously moving from generally a central portion of a display screen to a remote tool bar (housing the toggle button) juxtaposed to an end of the screen then back again. This repetitive motion and the attention one needs to employ to switch from the auxiliary mode or modes back to the primary mode of operation distracts the user's attention from actively reading or writing to the mundane task of switching between modes.

Figure 3:
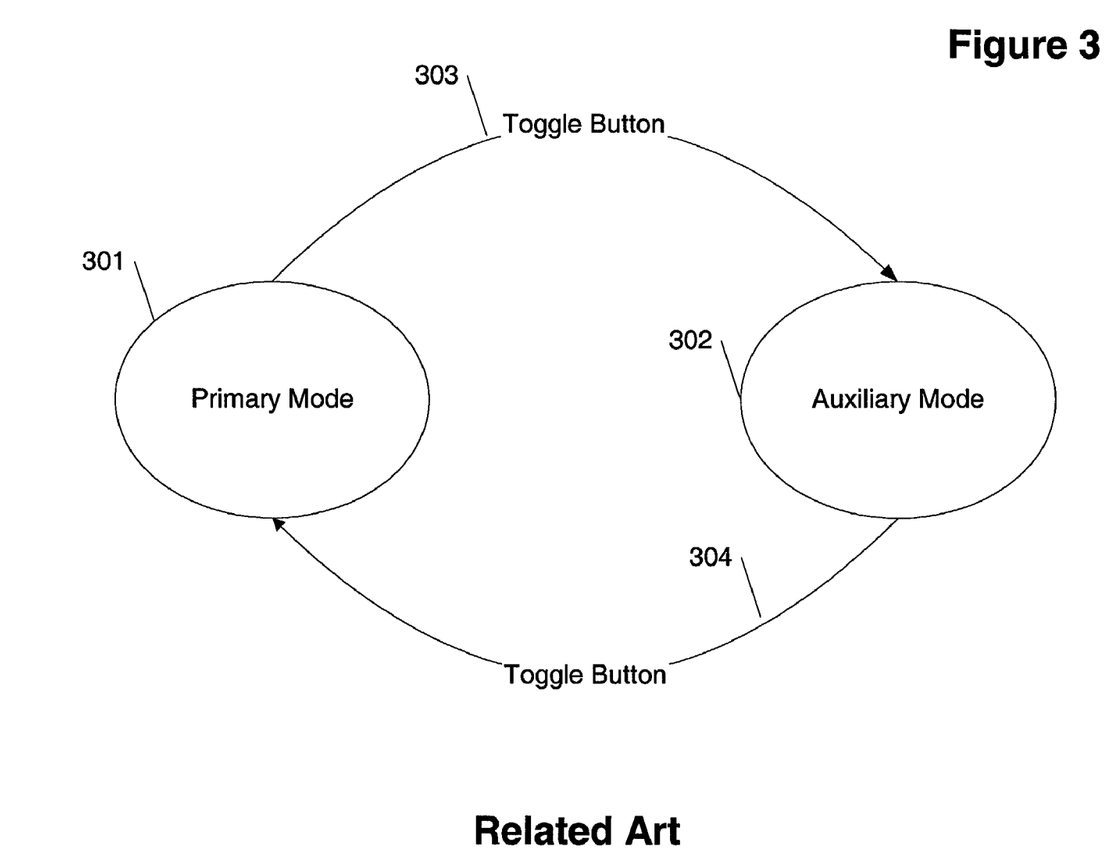
FIG. 3 shows conventional mode switching through the activation of buttons.

For example, FIG. 3 shows a conventional system for switching between modes. A primary mode 301 is where a user enters text, pastes text, and the like. An auxiliary mode is where a user erases text, highlights text, and selects text.

Accordingly, a need exists for minimizing operations for switching between modes of operation in a computer environment.

SUMMARY OF THE INVENTION

As discussed in the various copending patent applications incorporated herein by reference, aspects of the present invention are directed to a tablet-like computer that allows users to directly write on a display surface using a stylus. The display surface may physically, optically, and or electro magnetically detect the stylus. The computer may allow the user to write and to edit, manipulate, and create objects through the use of the stylus. Many of the features discussed in these copending applications are more easily performed by use of the various aspects of the present invention discussed herein.

An aspect of the present invention is directed to methods and apparatus for simulating gestures of a mouse by use of a stylus on a display surface. The present invention determines the operation a user wants to perform based on the user's input. This determination may include reference to other information including the location of the user's input on a digitizer (e.g, location on a screen) and the status of other objects or elements as displayed. By using this information, the system determines what the user wants to do and implements the action.

The present invention permits a user to enter into auxiliary modes including an erase mode, a highlight mode and a selection mode. By moving a stylus in a way inconsistent with one of the modes, the system offers the user the option of switching out of the auxiliary mode. In an alternate embodiment, the system may directly switch the user from the auxiliary mode to the primary mode.

These and other features of the invention will be apparent upon consideration of the following detailed description of preferred embodiments. Although the invention has been defined using the appended claims, these claims are exemplary in that the invention is intended to include the elements and steps described herein in any combination or subcombination. Accordingly, there are any number of alternative combinations for defining the invention, which incorporate one or more elements from the specification, including the description, claims, and drawings, in various combinations or subcombinations. It will be apparent to those skilled in the relevant technology, in light of the present specification, that alternate combinations of aspects of the invention, either alone or in combination with one or more elements or steps defined herein, may be utilized as modifications or alterations of the invention or as part of the invention. It is intended that the written description of the invention contained herein covers all such modifications and alterations.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention. In the accompanying drawings, elements are labeled with three-digit reference numbers, wherein the first digit of a reference number indicates the drawing number in which the element is first illustrated. The same reference number in different drawings refers to the same element.

DETAILED DESCRIPTION

Figure 1:
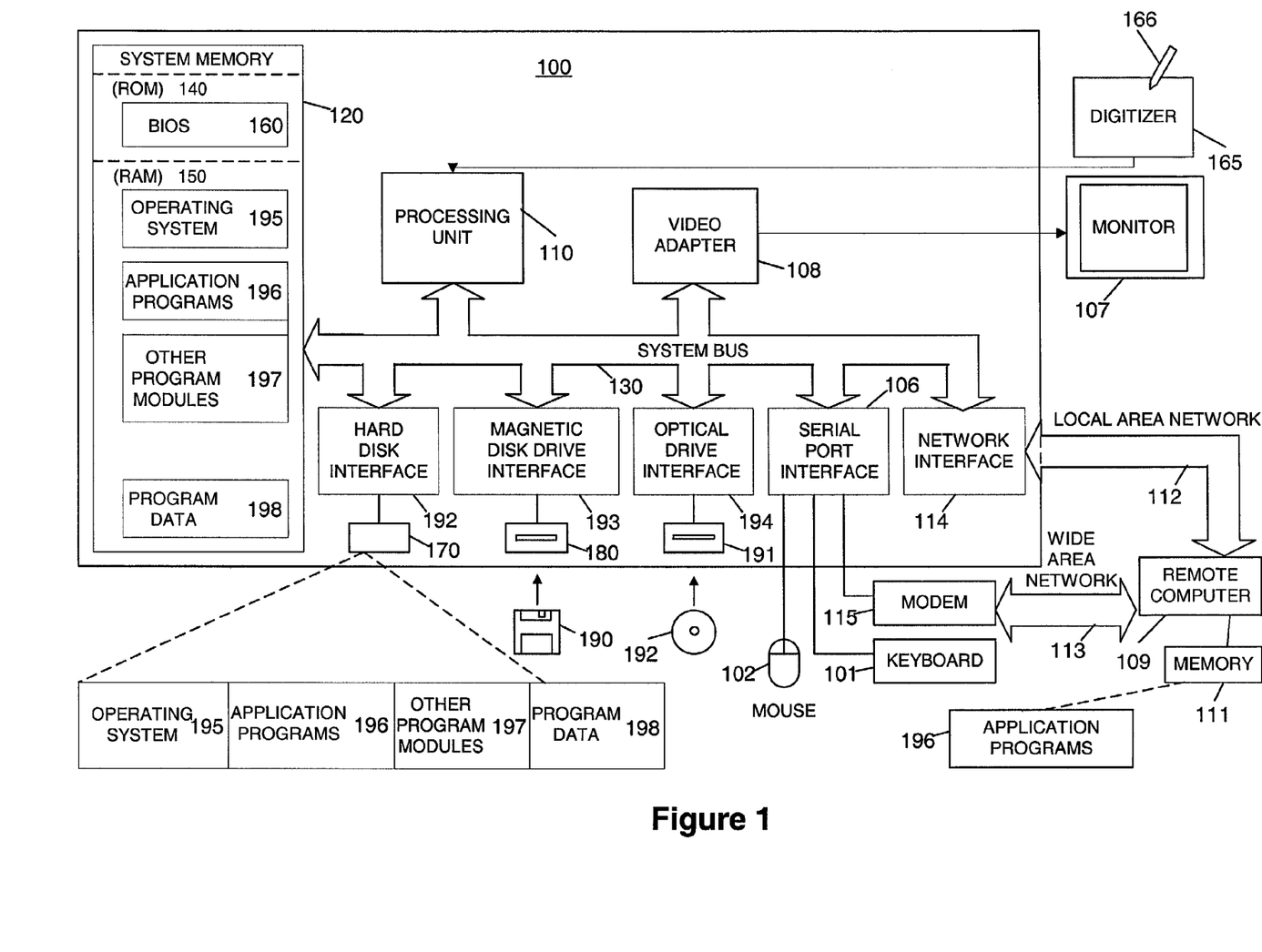
FIG. 1 is a schematic diagram of a general-purpose digital computing environment that can be used to implement various aspects of the invention.

The present invention may be more readily described with reference to FIGS. 1–5. FIG. 1 illustrates a schematic diagram of a conventional general-purpose digital computing environment that can be used to implement various aspects of the present invention. In FIG. 1, a computer 100 includes a processing unit 110, a system memory 120, and a system bus 130 that couples various system components including the system memory to the processing unit 110. The system bus 130 may be any of several types of bus structures including a memory bus or memory controller, a peripheral bus, and a local bus using any of a variety of bus architectures. The system memory 120 includes read only memory (ROM) 140 and random access memory (RAM) 150.

A basic input/output system 160 (BIOS), containing the basic routines that help to transfer information between elements within the computer 100, such as during start-up, is stored in the ROM 140. The computer 100 also includes a hard disk drive 170 for reading from and writing to a hard disk (not shown), a magnetic disk drive 180 for reading from or writing to a removable magnetic disk 190, and an optical disk drive 191 for reading from or writing to a removable optical disk 192 such as a CD ROM or other optical media. The hard disk drive 170, magnetic disk drive 180, and optical disk drive 191 are connected to the system bus 130 by a hard disk drive interface 192, a magnetic disk drive interface 193, and an optical disk drive interface 194, respectively. The drives and their associated computer-readable media provide nonvolatile storage of computer readable instructions, data structures, program modules and other data for the personal computer 100. It will be appreciated by those skilled in the art that other types of computer readable media that can store data that is accessible by a computer, such as magnetic cassettes, flash memory cards, digital video disks, Bernoulli cartridges, random access memories (RAMs), read only memories (ROMs), and the like, may also be used in the example operating environment.

A number of program modules can be stored on the hard disk drive 170, magnetic disk 190, optical disk 192, ROM 140 or RAM 150, including an operating system 195, one or more application programs 196, other program modules 197, and program data 198. A user can enter commands and information into the computer 100 through input devices such as a keyboard 101 and pointing device 102. Other input devices (not shown) may include a microphone, joystick, game pad, satellite dish, scanner or the like. These and other input devices are often connected to the processing unit 110 through a serial port interface 106 that is coupled to the system bus, but may be connected by other interfaces, such as a parallel port, game port or a universal serial bus (USB). Further still, these devices may be coupled directly to the system bus 130 via an appropriate interface (not shown). A monitor 107 or other type of display device is also connected to the system bus 130 via an interface, such as a video adapter 108. In addition to the monitor, personal computers typically include other peripheral output devices (not shown), such as speakers and printers. In a preferred embodiment, a pen digitizer 165 and accompanying pen or stylus 166 are provided in order to digitally capture freehand input. Although a direct connection between the pen digitizer 165 and the processing unit 110 is shown, in practice, the pen digitizer 165 may be coupled to the processing unit 110 via a serial port, parallel port or other interface and the system bus 130 as known in the art. Furthermore, although the digitizer 165 is shown apart from the monitor 107, it is preferred that the usable input area of the digitizer 165 be co-extensive with the display area of the monitor 107. Further still, the digitizer 165 may be integrated in the monitor 107, or may exist as a separate device overlaying or otherwise appended to the monitor 107.

The computer 100 can operate in a networked environment using logical connections to one or more remote computers, such as a remote computer 109. The remote computer 109 can be a server, a router, a network PC, a peer device or other common network node, and typically includes many or all of the elements described above relative to the computer 100, although only a memory storage device 111 has been illustrated in FIG. 1. The logical connections depicted in FIG. 1 include a local area network (LAN) 112 and a wide area network (WAN) 113. Such networking environments are commonplace in offices, enterprise-wide computer networks, intranets and the Internet.

When used in a LAN networking environment, the computer 100 is connected to the local network 112 through a network interface or adapter 114. When used in a WAN networking environment, the personal computer 100 typically includes a modem 115 or other means for establishing a communications over the wide area network 113, such as the Internet. The modem 115, which may be internal or external, is connected to the system bus 130 via the serial port interface 106. In a networked environment, program modules depicted relative to the personal computer 100, or portions thereof, may be stored in the remote memory storage device.

It will be appreciated that the network connections shown are exemplary and other techniques for establishing a communications link between the computers can be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Figure 2:
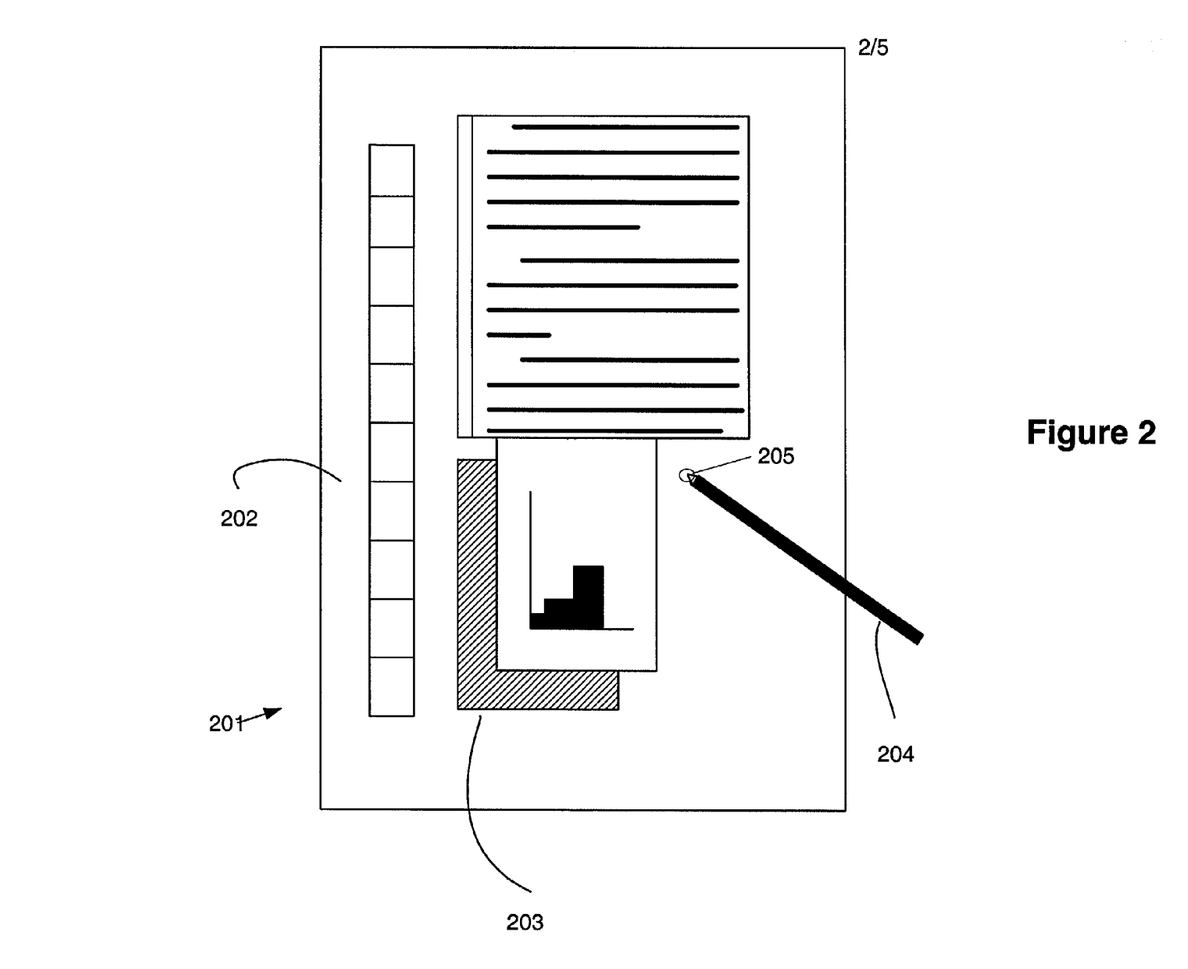
FIG. 2 is a plan view of a tablet computer and stylus that may be used in accordance with various aspects of the present invention.

FIG. 2 illustrates a tablet PC 201 that can be used in accordance with various aspects of the present invention. Any or all of the features, subsystems, and functions in the system of FIG. 1 can be included in the computer of FIG. 2. Tablet PC 201 includes a large display surface 202, e.g., a digitizing flat panel display, preferably, a liquid crystal display (LCD) screen, on which a plurality of windows 203 is displayed. Using stylus 204, a user can select, highlight, and write on the digitizing display area. Examples of suitable digitizing display panels include electromagnetic pen digitizers, such as the Mutoh or Wacom pen digitizers. Other types of pen digitizers, e.g., optical digitizers, may also be used. Tablet PC 201 interprets marks made using stylus 204 in order to manipulate data, enter text, and execute conventional computer application tasks such as spreadsheets, word processing programs, and the like.

A stylus could be equipped with buttons or other features to augment its selection capabilities. In one embodiment, a stylus could be implemented as a "pencil" or "pen", in which one end constitutes a writing portion and the other end constitutes an "eraser" end, and which, when moved across the display, indicates portions of the display are to be erased. Other types of input devices, such as a mouse, trackball, or the like could be used. Additionally, a user's own finger could be used for selecting or indicating portions of the displayed image on a touch-sensitive or proximity-sensitive display. Consequently, the term "user input device", as used herein, is intended to have a broad definition and encompasses many variations on well-known input devices.

Region 205 shows a feed back region or contact region permitting the user to determine where the stylus as contacted the digitizer. In another embodiment, the region 205 provides visual feedback when the hold status of the present invention has been reached.

Figure 4:
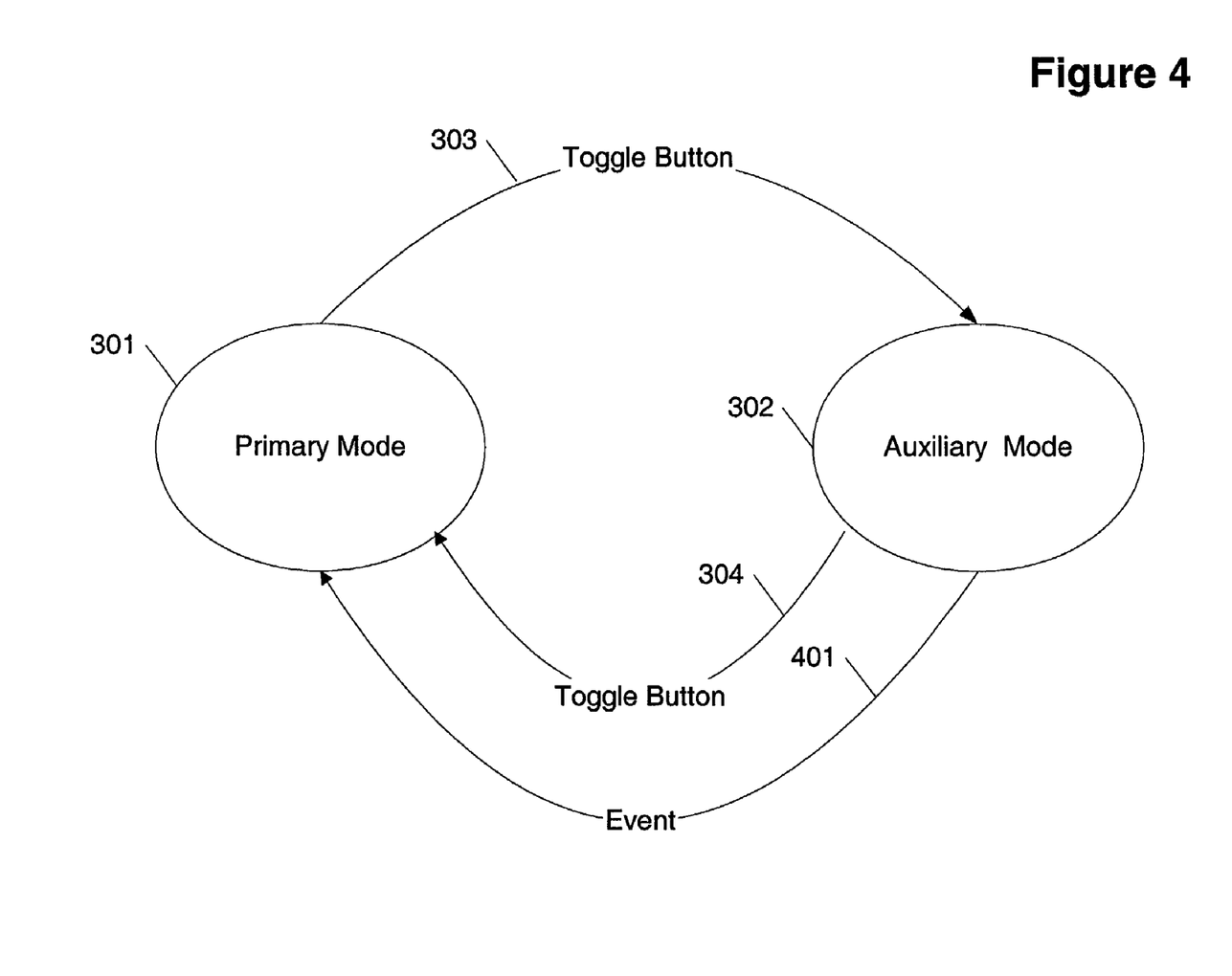
FIGS. 4–5 show mode switching including responding to events in accordance with embodiments of the present invention.

FIG. 4 shows the primary mode 301 and the auxiliary mode 302. To access the auxiliary mode 302, a user taps a toggle button 303 or other button as is known in the art. A "mode" as used herein is expansive in nature. It is intended to relate to operation of the primary input device or stylus. Switching between operations of the stylus or other input device is referenced as switching modes as apparent to the user. The underlying system implementing the invention is not constrained to operate in predefined modes. Rather, the system implementing the present invention may operate in states or may respond to actions including toggling of buttons or events that system interprets as suggesting a change in operation mode of a primary input device or stylus.

The auxiliary mode includes erasing (for example, erasing input ink or handwriting), highlighting (for example, adding a translucent ink to existing ink or text), or selecting objects. The selection mode permits a user to draw selection ink around objects or through objects and have the objects selected. For example, the user may use a stroke or a hold and drag gesture to start the selection ink mode (as described in greater detail in U.S. Ser. No. 60/240,772, entitled "Highlevel Active Pen Matrix" filed Nov. 10, 2000, incorporated herein by reference for essential subject matter).

To return back to back to the primary mode 301, a user may again toggle the toggle button in step 304. This button may be referred to as a mode switching button. Alternatively, the user may select another button that reset or transitions the user back to the primary mode 301. However, toggling a remote button is tedious. Accordingly, the present invention permits a way of returning to the primary mode without having to toggle a remote button. The system monitors the actions of the stylus to determine if it performs a gesture other than a single or double tap (for example, a triple tap or a stroke with certain characteristics) in a place other than on a remote, mode switching button. This gesture or gestures suggest that the user wants to return to the primary mode 301.

The system uses various aspects of the gesture or gesture to determine if the user has suggested that he wants to return to the primary mode. One aspect of the gesture is the proximity of nearby objects. For example, if no objects are near the starting point or anywhere along the path of the gesture (if it was a stroke, for example) or encircled by the gesture, the gesture may be interpreted as indicative of returning to the primary contact mode.

The actions may be the same for all auxiliary modes (erasing, highlighting, or selecting). For example, the user may move the stylus in a small circle or other shape or small jiggling of the stylus tip.

Alternatively, the system may recognize different actions for the various modes. For the erasing mode, the system may recognize events such as attempting to erase where there is no object or attempting to erase non-erasable objects. The system displays to the user an option of switching out of the auxiliary mode. If the user desires to stay in the erase mode, the user interacts with the display to stay in the erase mode. This may mean selecting a "Do Not Switch" option or interact with the display in a manner appropriate with the present mode. If the user desires to switch back to the primary mode 301, the user interacts with the display to accept the choice of switching. If the user does not interact with the displayed options, the system may switch to the primary mode. This would be useful when the user was distracted for some time and the system resets to provide the user with a known starting point to interact with the displayed content.

The display offered to the user may be made easier to operate by placing the selection choices under or near the stylus' last contact with the screen. The resulting user interface will be easier to operate based on an analysis of the interface using Fitt's Law. Fitt's Law defines an index of difficulty for human responses as $ID=(\log_2(2A/W))$ where A is the amplitude or size of a movement and W is the width of a target. Fitt's Law indicates that movement time=a+b (ID) where a and b are constants. Here, the smaller the movement and the larger the target, the smaller the index of difficulty. More information regarding Fitt's Law may be found at http://psych.hanover.edu/classes/hfnotes2/sld041.html.

For the highlighting mode, the events that may generate events 401 include movements too small for highlighting due to the thickness of the highlighting ink. For example, if the highlighting ink is 5 mm thick, movements of the stylus below 1 mm, for example (other ratios may be used and are considered part of the invention). Also moving the stylus within an already highlighted region is considered as an indication that the user is attempting to write rather than highlight. If the ink is 5 mm thick, repeated 1 mm or less movements of the highlighter indicate that a user is attempting to write or perform an action other than highlighting. Further, 2 mm oscillations or jiggling the stylus with 1 mm strokes can reliably be interpreted as attempting to write. This may be generalized as including actions that are less than half of the line width of the highlighting ink. Further, these relative movement sizes may be adjustable by the user to account for various work environments subject to mechanical disturbances or vibrations. For example, if a user is riding in the back of a bus and highlighting a document the user is reading, the user does not want the vibrations of the bus to lead to jiggling of the stylus relative to the digitizer surface to be greater than the threshold for switching back to the primary mode.

For the selecting mode, selecting nothing (not encountering any objects or not surrounding any objects) generates event 401.

Figure 5:
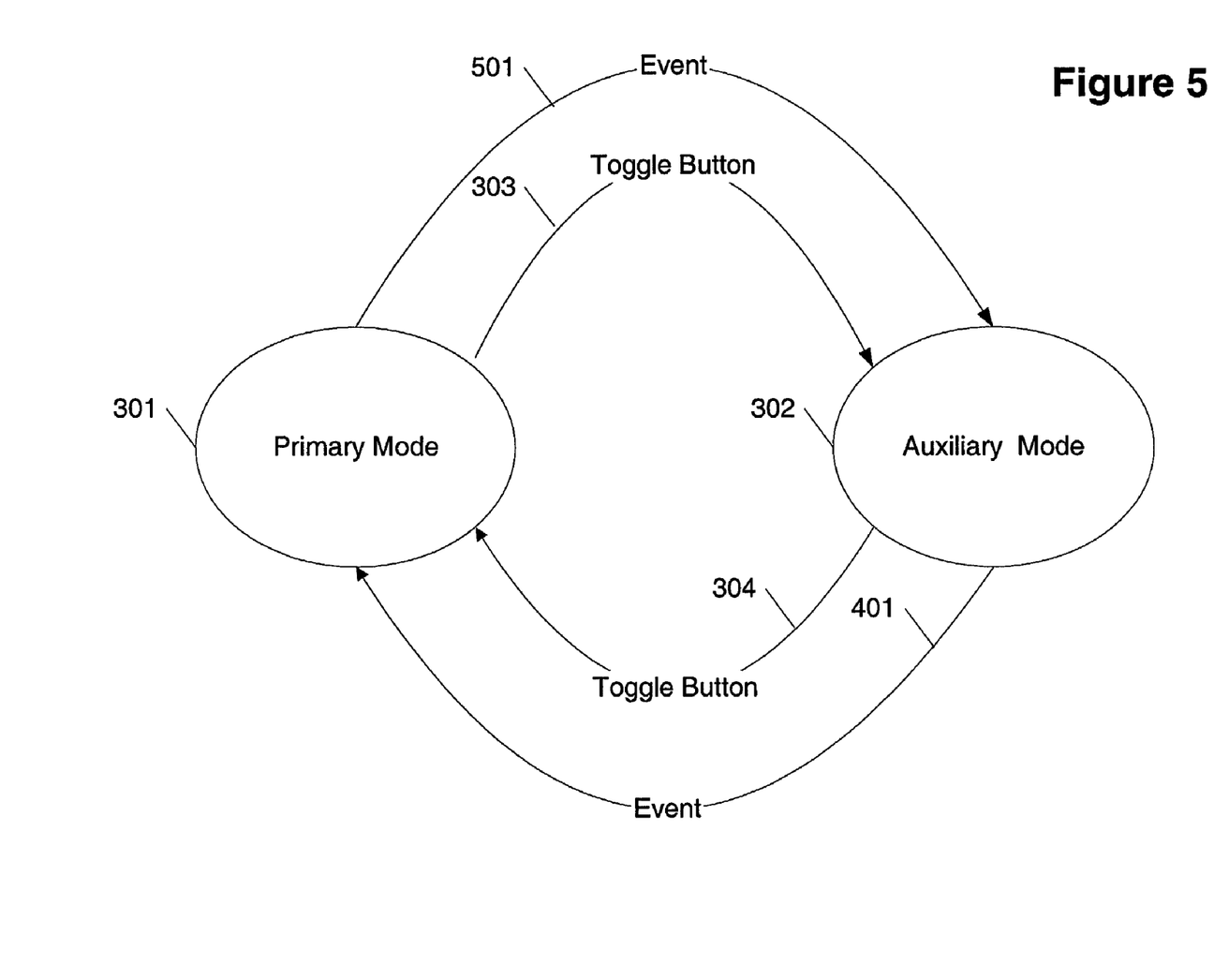

FIG. 5 shows an alternative embodiment similar to that of FIG. 4. This embodiment includes another event 501 that puts the system into the auxiliary mode 302 from primary mode 301. Alternatively, event 501 changes the system from one auxiliary mode to another auxiliary mode. For example, performing a gesture more indicative of a selection mode may indicate that the user wants to switch from a primary mode or an erasing mode or a highlighting mode to the selection mode. These gestures may be defined for equal modes when there is no primary mode.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A method for switching between an erasing mode of operation and a primary mode of operation of a computer system with a digitizer and stylus, the method comprising steps of:
    receiving first user input comprising a gesture while in the erasing mode;
    determining whether the gesture is indicative of an action to erase no objects; and
    responsive to determining that the gesture is indicative of an action to erase no objects, switching the system from the erasing mode to the primary mode.

2. The method of claim 1 further including steps of:
    presenting a user interface including an option to switch to the primary mode or stay in the erasing mode; and
    receiving second user input responsive to said user interface, wherein the step of switching is further responsive to the second user input.

3. A method for switching between an erasing mode of operation and a primary mode of operation of a computer system with a digitizer and stylus, the method comprising steps of:
    receiving first user input comprising a gesture on an area containing zero objects while in the erasing mode;
    determining whether the gesture is indicative of an action to erase the area containing zero objects; and
    responsive to determining that the gesture is indicative of an action to erase the area containing zero objects, switching the system from the erasing mode to the primary mode.

4. The method of claim 3 further including steps of:
    presenting a user interface including an option to switch to the primary mode or stay in the erasing mode; and
    receiving second user input responsive to said user interface, wherein the step of switching is further responsive to the second user input.

5. A method for switching between a selection mode of operation and a primary mode of operation of a computer system with a digitizer and stylus, the method comprising steps of:
    receiving first user input comprising a gesture on an area containing zero objects while in the selection mode;
    determining whether the gesture is indicative of an action to select the area containing zero objects; and
    responsive to determining that the gesture is indicative of an action to select the area containing zero objects, switching the system from the selection mode to the primary mode.

6. The method of claim 5 further including steps of:
    presenting a user interface including an option to switch to the primary mode or stay in the selection mode; and
    receiving second user input responsive to said user interface, wherein the step of switching is further responsive to the second user input.

7. A method for switching between a highlighting mode of operation and a primary mode of operation of a computer system with a digitizer and stylus, the method comprising steps of:
    receiving first user input comprising a gesture while in the highlighting mode;
    determining whether the gesture is to highlight over a distance that is smaller than a threshold distance; and
    responsive to determining that the gesture is to highlight over a distance that is smaller than the threshold distance, switching the system from the highlighting mode to the primary mode.

8. The method of claim 7, wherein the step of determining includes determining whether the distance is smaller than a thickness of highlighting ink associated with the highlighting mode.

9. The method of claim 7 wherein the step of determining includes determining whether the distance is less than half of a line thickness of highlighting ink associated with the highlighting mode.

10. The method of claim 7 further including a step of receiving second user input defining the threshold distance.

11. The method of claim 7 further including steps of:
    presenting a user interface including an option to switch to the primary mode or stay in the highlighting mode; and
    receiving second user input responsive to said user interface, wherein the step of switching is further responsive to the second user input.

12. A computer-readable medium having a program stored thereon for switching between an erasing mode of operation and a primary mode of operation of a computer system with a digitizer and stylus, said program comprising computer-executable instructions for performing steps of:
    receiving first user input comprising a gesture while in the erasing mode;
    determining whether the gesture is indicative of an action to erase no objects; and responsive to determining that the gesture is indicative of an action to erase no objects, switching the system from the erasing mode to the primary mode.

13. The computer-readable medium of claim 12 wherein the computer-executable instructions are further for performing steps of:
presenting a user interface including an option to switch to the primary mode or stay in the erasing mode; and
receiving second user input responsive to said user interface, wherein the step of switching is further responsive to the second user input.

14. A computer-readable medium having a program stored thereon for switching between an erasing mode of operation and a primary mode of operation of a computer system with a digitizer and stylus, said program comprising computer-executable instructions for performing steps of:
receiving first user input comprising a gesture on an area containing zero objects while in the erasing mode;
determining whether the gesture is indicative of an action to erase the area containing zero objects; and
responsive to determining whether the gesture is indicative of an action to erase the area containing zero objects, switching the system from the erasing mode to the primary mode.

15. The computer-readable medium of claim 14 wherein the computer-executable instructions are further for performing steps of:
presenting a user interface including an option to switch to the primary mode or stay in the erasing mode; and
receiving second user input responsive to said user interface, wherein the step of switching is further responsive to the second user input.

16. A computer-readable medium having a program stored thereon for switching between a selection mode of operation and a primary mode of operation of a computer system with a digitizer and stylus, said program comprising computer-executable instructions for performing steps of:
receiving first user input comprising a gesture on an area containing zero objects while in the selection mode;
determining whether the gesture is indicative of an action to select the area containing zero objects; and
responsive to determining that the gesture is indicative of an action to select the area containing zero objects, switching the system from the selection mode to the primary mode.

17. The computer-readable medium of claim 16 wherein the computer-executable instructions are further for performing steps of:
presenting a user interface including an option to switch to the primary mode or stay in the selection mode; and
receiving second user input responsive to said user interface, wherein the step of switching is further responsive to the second user input.

18. A computer-readable medium having a program stored thereon for switching between a highlighting mode of operation and a primary mode of operation of a computer system with a digitizer and stylus, said program comprising computer-executable instructions for performing steps of:
receiving first user input comprising a gesture while in the highlighting mode;
determining whether the gesture is to highlight over a distance that is smaller than a threshold distance; and
responsive to determining that the gesture is to highlight over a distance that is smaller than the threshold distance, switching the system from the highlighting mode to the primary mode.

19. The computer-readable medium of claim 18 wherein the step of determining includes determining whether the distance is smaller than a thickness of highlighting ink associated with the highlighting mode.

20. The computer-readable medium of claim 18 wherein the step of determining includes determining whether the distance is less than half of a line thickness of highlighting ink associated with the highlighting mode.

21. The computer-readable medium of claim 18 wherein the computer-executable instructions are further for performing a step of receiving second user input defining the threshold distance.

22. The computer-readable medium of claim 18 wherein the computer-executable instructions are further for performing steps of:
presenting a user interface including an option to switch to the primary mode or stay in the highlighting mode; and
receiving second user input responsive to said user interface, wherein the step of switching is further responsive to the second user input.

* * * * *

UNITED STATES PATENT AND TRADEMARK OFFICE
CERTIFICATE OF CORRECTION

PATENT NO. : 7,002,558 B2  Page 1 of 1
APPLICATION NO. : 09/741107
DATED : February 21, 2006
INVENTOR(S) : Keely et al.

It is certified that error appears in the above-identified patent and that said Letters Patent is hereby corrected as shown below:

On page 2, in field (56), under "Other Publications", in column 2, line 26, delete "meteror" and insert -- meteor --, therefor.

On Sheet 2 of 5, above "Figure 2" delete "2/5".

In column 1, line 25, delete "Ser. No. 60/247,831" and insert -- Ser. No. 60/247,479 --.

In column 2, line 59, delete "e.g," and insert -- e.g., --, therefor.

In column 7, line 54, in Claim 2, after "claim 1" insert -- , --.

In column 8, line 5, in Claim 4, after "claim 3" insert -- , --.

In column 8, line 23, in Claim 6, after "claim 5" insert -- , --.

In column 8, line 46, in Claim 9, after "claim 7" insert -- , --.

In column 8, line 50, in Claim 10, after "claim 7" insert -- , --.

In column 8, line 52, in Claim 11, after "claim 7" insert -- , --.

In column 9, line 4, in Claim 13, after "claim 12" insert -- , --.

Signed and Sealed this

Thirtieth Day of March, 2010

David J. Kappos
*Director of the United States Patent and Trademark Office*